Jan. 8, 1957        R. F. HIGBY        2,777,067

TRIPLE CHANNEL TIME SHARING SWITCH

Filed May 26, 1954

INVENTOR
Richard F. Higby.
BY
*F. E. Browder*
ATTORNEY

United States Patent Office 2,777,067
Patented Jan. 8, 1957

2,777,067

TRIPLE CHANNEL TIME SHARING SWITCH

Richard F. Higby, Severna Park, Md., assignor to Westinghouse Electric Corporation, East Pittsburgh, Pa., a corporation of Pennsylvania Application May 26, 1954, Serial No. 432,483

11 Claims. (Cl. 250—36)

This invention relates to multivibrators, and more particularly to a multivibrator for use as a time sharing switch.

It is an object of this invention to provide an improved multivibrator.

It is another object to provide a multitube multivibrator utilizing a diode to bring about the desired multiaction between the tubes.

It is a further object to provide a tube multivibrator which utilizes individual cathode resistors.

It is an additional object to provide a multivibrator in which waveforms of opposite polarity may be obtained.

It is another object to provide a multitube multivibrator in which during cyclic conduction two tubes conduct and one tube is held in its cut-off state.

In accordance with this invention, a multivibrator is provided, which comprises three tubes, each connected to the other two so as to resemble a conventional multivibrator when looking at the interconnecting circuitry of any two of the tubes.

A diode is provided in the circuit connecting the plate and the grid of each tube. Without the diode, conventional multiaction would be prevented due to one tube opposing any change in the other two.

In order to obtain stable multiaction, each tube is capable of two modes of operation, that is, current saturation and current cut off. The diode maintains one tube in its current saturation state while the other two tubes exchange their states of stable operation. This has the effect of rotating the current cut off mode around the circuit loop comprising the three tubes.

These and other objects of the invention are effected as will be apparent from the following description and claims, taken in accordance with the accompanying drawings which form a part of this application and in which:

Throughout the drawings, like reference characters refer to like elements in the various figures.

Figure 1:
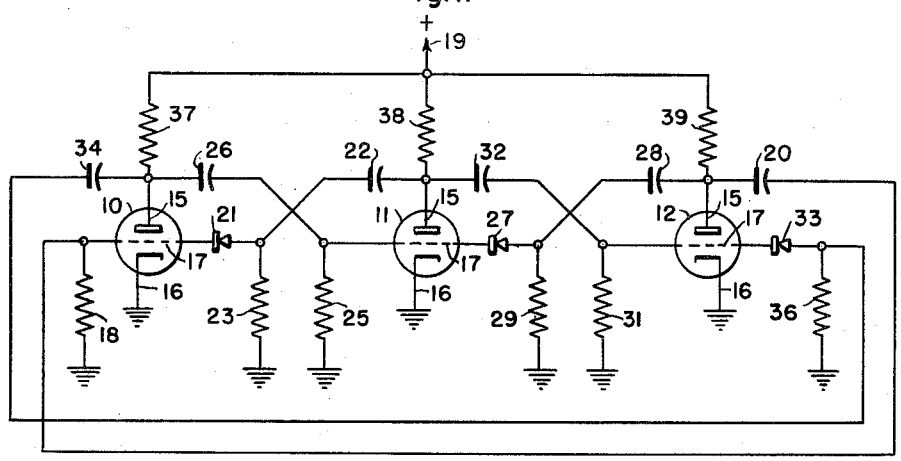
Figure 1 is a circuit schematic of a multivibrator embodying this invention.

Referring to Fig. 1, in detail, I show a multivibrator comprising three triodes 10, 11 and 12. Each of the triodes 10, 11 and 12 has a plate 15, a cathode 16 and a grid 17.

The grid 17 of the tube 10 is connected through a resistor 18 to ground potential. The grid 17 of the tube 10 is connected to the plate 15 of the tube 12 through a capacitor 20. The grid 17 of the tube 10 is also connected through a diode 21 and a capacitor 22 to the plate 15 of the tube 11. A resistor 23 is connected between the diode 21 and the capacitor 22.

Likewise, the grid 17 of the tube 11 is connected through a resistor 25 to ground potential. The grid 17 of the tube 11 is connected to the plate 15 of the tube 10 through a capacitor 26. The grid 17 of the tube 11 is also connected through a diode 27 and a capacitor 28 to the plate 15 of the tube 12. A resistor 29 is connected between the diode 27 and ground potential to provide a leak for the diode 27 and the capacitor 28.

Likewise, the grid 17 of the tube 12 is connected through a resistor 31 to ground potential. The grid 17 of the tube 12 is connected to the plate 15 of the tube 11 through a capacitor 32. The grid 17 of the tube 12 is also connected through a diode 33 and a capacitor 34 to the plate 15 of the tube 10. A resistor 36 is connected between the diode 33 and ground potential to provide a leak for the diode 33 and the capacitor 34.

The plates 15 of the tubes 10, 11 and 12 are connected through load resistors 37, 38 and 39, respectively, to the plate voltage supply source indicated by the reference character 19.

The cathodes 16 of the tubes 10, 11 and 12 are all connected directly to ground potential.

Figure 2:
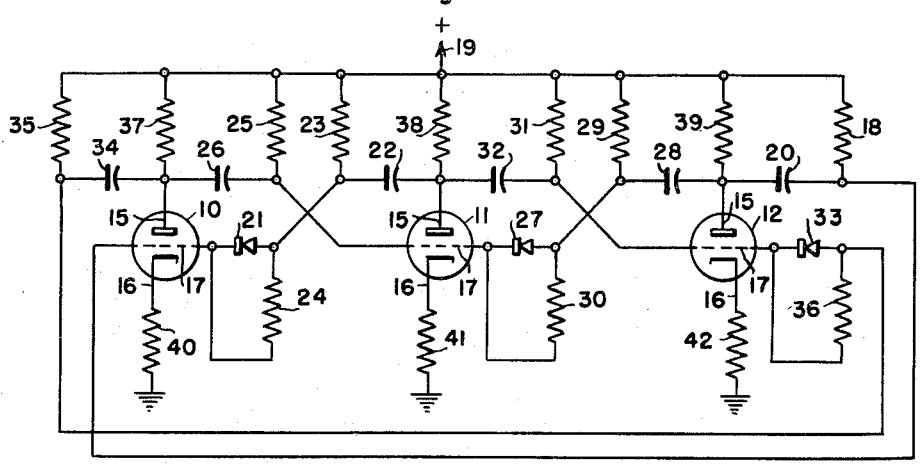
Fig. 2 is a modification of the circuit schematic of Fig. 1.

Referring to Fig. 2, in detail, I show a multivibrator comprising three triodes 10, 11 and 12. Each of the triodes 10, 11 and 12 has a plate 15, a cathode 16 and a grid 17.

The grid 17 of the tube 10 is connected through a resistor 18 to the positive terminal of a plate voltage supply source 19. The grid 17 of the tube 10 is connected to the plate 15 of the tube 12 through a capacitor 20. The grid 17 of the tube 10 is also connected through a diode 21 and a capacitor 22 to the plate 15 of the tube 11. A resistor 23 is connected to the plate supply voltage source 19 to provide a leak for the diode 21 and the capacitor 22. The diode 21 is shunted by a resistor 24.

Likewise, the grid 17 of the tube 11 is connected through a resistor 25 to the plate supply voltage source 19. The grid 17 of the tube 11 is connected to the plate 15 of the tube 10 through a capacitor 26. The grid 17 of the tube 11 is also connected through a diode 27 and a capacitor 28 to the plate 15 of the tube 12. A resistor 29 is connected to the plate supply voltage source 19 to provide a leak for the diode 27 and the capacitor 28. The diode 27 is shunted by a resistor 30.

Likewise, the grid 17 of the tube 12 is connected through a resistor 31 to the plate supply voltage source 19. The grid 17 of the tube 12 is connected to the plate 15 of the tube 11 through a capacitor 32. The grid 17 of the tube 12 is also connected through a diode 33 and a capacitor 34 to the plate 15 of the tube 10. A resistor 35 is connected to the plate supply voltage source 19 to provide a leak for the diode 33 and the capacitor 34. The diode 33 is shunted by a resistor 36.

The plates 15 of the tubes 10, 11 and 12 are connected through load resistors 37, 38 and 39, respectively, to the plate voltage supply source 19.

The cathodes of the tubes 10, 11 and 12 are all connected through cathode resistors 40, 41 and 42 respectively, to ground potential.

Figure 3:
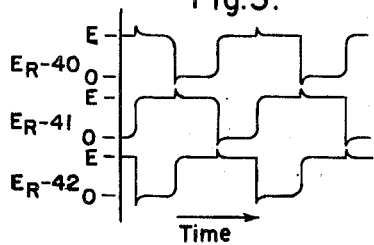
Fig. 3 is a graph illustrating the waveforms of the potentials at the cathodes of the three tubes of Fig. 2.

The waveforms in Fig. 3 represent the voltage appearing across the cathode resistors 40, 41 and 42 shown in Fig. 2. Waveforms of opposite polarity would be derived from the load resistors 37, 38 and 39 shown in Fig. 1. The waveforms illustrated in Fig. 3 show a spike to occur in the conducting tube while the other two tubes are switching modes of operation. This is due to the positive pulse of one tube reaching the grid of the conducting tube while the negative pulse from the other tube has been retarded from reaching the grid of the conducting tube. This spike is substantially weakened by shunting the diodes 21, 27 and 33 with the resistors 24, 30 and 36 to form a divider to allow a suitable portion of the negative pulse to reach the grid of the conducting tube and oppose that percentage of the arriving positive pulse.

In operation, when the electrode voltages are first applied, the circuit will break into oscillation at its natural free running frequency by virtue of any transient action. Theory applicable to the starting action of conventional multivibrators will also apply in this invention.

Assume the circuit in Fig. 1 to be oscillating and that tube 11 is cut off and tubes 10 and 12 are heavily conducting. The tube 11 is held cut off due to the charge on the capacitor 26 leaking off through the resistor 25. When the charge on the capacitor 26 has bled sufficiently low that the voltage on the resistor 25 exceeds the threshold voltage of the cut off of the tube 11, tube 11 starts to conduct. Tube 11 applies a negative pulse through the capacitor 32 to the grid 17 of the tube 12 to cut off tube 12. Similarly, the tube 11 attempts to apply a negative pulse to the grid 17 of the tube 10 through the capacitor 22, but the indicated polarity of the diode 21 prevents this voltage from being impressed on the grid 17 of tube 10. As the result of the tube 12 being cut off, a positive pulse from the plate 15 of the tube 12 is applied to the grid 17 of the tube 10 through the capacitor 20. This positive pulse maintains the tube 10 in its conducting state. As the result of the tube 12 being cut off, a positive pulse from the plate 15 of the tube 12 is applied to the grid 17 of the tube 11 through the capacitor 28 and the diode 27. This positive pulse tends to amplify the original increase in conduction of the tube 11 and provides the proper feedback for fast switching of the tube 11 from a state of cut off to one of conduction.

With the tubes 10 and 11 conducting, the tube 12 is held cut off due to the charge on the capacitor 32 leaking off through the resistor 31. When the charge on the capacitor 32 has bled sufficiently low that the voltage on the resistor 31 exceeds the threshold voltage of the cut off of the tube 12, tube 12 starts to conduct. Tube 12 applies a negative pulse through the capacitor 20 to the grid 17 of the tube 10 to cut off tube 10. Similarly, the tube 12 attempts to apply a negative pulse to the grid 17 of the tube 11 through the capacitor 28, but the indicated polarity of the diode 27 prevents this voltage from being impressed on the grid 17 of tube 11. As the result of the tube 10 being cut off, a positive pulse from the plate 15 of the tube 10 is applied to the grid 17 of the tube 11 through the capacitor 26. This positive pulse maintains the tube 11 in its conducting state. As a result of the tube 10 being cut off, a positive pulse from the plate 15 of the tube 10 is applied to the grid 17 of the tube 12 through the capacitor 34 and the diode 33. This positive pulse tends to amplify the original increase in conduction of the tube 12 and provide the proper feedback for fast switching of the tube 12 from a state of cut off to one of conduction.

With the tubes 11 and 12 conducting, the tube 10 is held off due to the charge on the capacitor 20 leaking off through the resistor 18. When the charge on the capacitor 20 has bled sufficiently low that the voltage on the resistor 18 exceeds the threshold voltage of the cut off of the tube 10, tube 10 starts to conduct. Tube 10 applies a negative pulse through the capacitor 26 to the grid 17 of the tube 11 to cut off tube 11. Similarly, the tube 10 attempts to apply a negative pulse to the grid 17 of the tube 12 through the capacitor 34, but the indicated polarity of the diode 33 prevents this voltage from being impressed on the grid 17 of the tube 12. As the result of the tube 11 being cut off, a positive pulse from the plate 15 of the tube 11 is applied to the grid 17 of the tube 12 through the capacitor 32. This positive pulse maintains the tube 12 in its conducting state. As a result of the tube 11 being cut off, a positive pulse from the plate 15 of the tube 11 is applied to the grid 17 of the tube 10 through the capacitor 22 and the diode 21. This positive pulse tends to amplify the original increase in conduction of the tube 10 and provides the proper feedback for fast switching of the tube 10 from a state of cut off to one of conduction.

The above action is a continuous cycling process, progressing from the tube 10 to the tube 12 by means of the tube 11. The reverse action is obtained by reversing the polarity of the diodes 21, 27 and 33.

The frequency of oscillation is determined by the RC time constants (capacitor 26, resistor 25; capacitor 32, resistor 31; and capacitor 20, resistor 18).

The diodes 21, 27 and 33 may take the form of any semiconductor as long as the shunt capacity is not objectionable and its inverse voltage rating is not exceeded.

Fig. 2 operates in a similar manner as described above for Fig. 1; except that the grid resistors 18, 25 and 31 are connected to the plate supply voltage source 19. The reason for this connection is to obtain faster switching of a tube from a state of cut off to one of conduction. Also, the diodes 21, 27 and 33 are shunted by the resistors 24, 30 and 36 respectively, for the purpose explained previously. Individual cathode resistors 40, 41 and 42 are provided should the cathodes be more desirable points than the plates from which to obtain signals.

This invention is applicable for use not only as a time sharing switch, either free running or synchronized in with some reference frequency, but to counter circuits, and other applications requiring rapid electronic switching. The synchronization may be accomplished by adjusting the time constant on one tube to be excessive and triggering the grid of that tube with pulses of the reference frequency.

While I have shown my invention in preferred forms, it will be obvious to those skilled in the art that it is not so limited but is susceptible of various changes and modifications without departing from the spirit thereof.

I claim as my invention:

1. A multivibrator comprising three electron tubes each having a cathode, a control grid and a plate, a resistor and a capacitor connecting the grid of each tube with the plate of another tube, a diode connecting the grid of each tube with the plate of another tube, means for connecting positive voltage to the plates of said tubes, and means comprising an individual resistor for each cathode of said tubes for connecting each of said cathodes to ground potential.

2. A multivibrator comprising three electron tubes each having a cathode, a control grid and a plate, a resistor and a capacitor connecting the grid of each tube with the plate of a preceding tube, a diode connecting the grid of each tube with the plate of a succeeding tube, means for connecting a positive voltage to the plates of said tubes, and means comprising an individual resistor for each cathode of said tubes for connecting each of said cathodes to ground potential.

3. A multivibrator as claimed in claim 1, in which a capacitor is connected in series with said diode.

4. A multivibrator as claimed in claim 1, in which a resistor is connected from said diode to ground potential.

5. A multivibrator as claimed in claim 1, in which said diode is shunted with a resistor.

6. A multivibrator comprising first, second and third electron tubes each having a control grid, a cathode and a plate, a first resistor and a capacitor connecting the grid of said first tube with the plate of said third tube, a second resistor and a capacitor connecting the grid of said second tube with the plate of said first tube, a third resistor and a capacitor connecting the grid of said third tube with the plate of said second tube, a diode connecting the grid of said first tube with the plate of said second tube, a diode connecting the grid of said second tube with the plate of said third tube, a diode connecting the grid of said third tube with the plate of said first tube, means for connecting positive voltage to the plates of said tubes, and means comprising an individual cathode resistor for connecting each cathode of said tubes to ground potential.

7. A multivibrator as claimed in claim 6, in which a capacitor is connected in series with each of said diodes.

8. A multivibrator as claimed in claim 6, in which one of said resistor-capacitor combinations has a time constant larger than the time constants of the other resistor-capacitor combinations.

9. A multivibrator as claimed in claim 6, in which a resistor is connected from each of said diodes to ground potential.

10. A multivibrator as claimed in claim 6, in which each of said diodes is shunted with a resistor.

11. A multivibrator as claimed in claim 6, in which each of the resistor-capacitor combinations connecting the grid of one tube and the palte of another tube has the same time constant.

References Cited in the file of this patent

UNITED STATES PATENTS

| | | |
|---|---|---|
| 2,593,452 | Hoeppner | Apr. 22, 1952 |
| 2,594,092 | Taylor | Apr. 22, 1952 |
| 2,623,170 | Dickinson | Dec. 23, 1952 |